United States Patent
Golonka et al.

(10) Patent No.: US 11,811,658 B1
(45) Date of Patent: Nov. 7, 2023

(54) METHOD FOR MOBILE AD-HOC NETWORK (MANET) MULTI-HOP ROUTING IN A BROADCAST DOMAIN

(71) Applicant: Raytheon Company, Waltham, MA (US)

(72) Inventors: Walter M. Golonka, Diamond Bar, CA (US); Tyler J. Ulinskas, San Diego, CA (US); David A. Duran, Placentia, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 18/151,674

(22) Filed: Jan. 9, 2023

(51) Int. Cl.
*G06F 15/173* (2006.01)
*H04L 45/74* (2022.01)
*H04L 45/02* (2022.01)
*H04L 45/00* (2022.01)

(52) U.S. Cl.
CPC ............ *H04L 45/74* (2013.01); *H04L 45/02* (2013.01); *H04L 45/566* (2013.01)

(58) Field of Classification Search
CPC ........ H04L 45/74; H04L 45/02; H04L 45/566
USPC ....................................................... 709/238
See application file for complete search history.

(56) References Cited

U.S. PATENT DOCUMENTS

| | | | | |
|---|---|---|---|---|
| 7,142,866 | B2* | 11/2006 | Windham | H04L 45/302 455/452.2 |
| 7,167,715 | B2* | 1/2007 | Stanforth | G01C 21/206 709/224 |
| 7,742,399 | B2* | 6/2010 | Pun | H04L 45/28 370/227 |
| 8,125,964 | B2* | 2/2012 | Ling | G01S 5/0289 455/343.1 |
| 8,718,055 | B2* | 5/2014 | Vasseur | H04W 40/248 370/252 |
| 8,942,197 | B2* | 1/2015 | Rudnick | H04W 72/121 370/254 |
| 10,531,500 | B2* | 1/2020 | Ulinskas | H04W 76/10 |
| 11,463,934 | B1* | 10/2022 | Kwon | H04L 45/32 |
| 2003/0153338 | A1* | 8/2003 | Herz | H04W 4/029 455/517 |

* cited by examiner

*Primary Examiner* — Alicia Baturay
(74) *Attorney, Agent, or Firm* — Daly, Crowley, Mofford & Durkee, LLP

(57) ABSTRACT

A method for use in a first layer-3 switch, the method comprising: learning, by the first layer-3 switch, a first layer-3/layer-2 (L3/L2) cache, the learning of the first L3/L2 cache including generating a first cache entry that maps a layer-3 address of a first device to a layer-2 address of the first device, the first device being part of a first LAN portion; and transmitting, over a wireless network, contents of the first L3/L2 cache to a second layer-3 switch, the transmitted contents including at least a portion of the first cache entry, the second layer-3 switch being part a second LAN portion, the second LAN portion being connected to the first LAN portion via the wireless network.

20 Claims, 10 Drawing Sheets

CACHE/ROUTING TABLE OF L3RSW 1 — 600A

- Device I/F Address (IPv4, Physical Address) ← 601
  - 192.168.1.10/24, 00:00:00:00:00:0A
- L3RSW I/F Address (IPv4, Physical Address) ← 602
  - LAN I/F – 192.168.1.1/24, 00:00:00:00:00:01
  - Internal I/F – 192.168.1.1/32, 00:00:00:00:01:01
  - Wireless I/F – 172.16.1.1/24, 00:00:00:01:01:01
- Local Cache (learned via LAN I/F) ← 603
  - 192.168.1.10, 00:00:00:00:0A, dynamic ← 603A
- Remote Cached (learned via distribution) ← 604
  - 192.168.1.20, 00:00:00:00:01, static ← 604A
  - 192.168.1.30, 00:00:00:00:01, static ← 604B
- Routing Table ← 605
  - 192.168.1.10/32 via LAN I/F, static ← 605A
  - 192.168.1.20/32 via 172.16.1.2, dynamic ← 605B
  - 192.168.1.30/32 via 172.16.1.3, dynamic ← 605C

FIG. 6A

CACHE/ROUTING TABLE OF L3RSW 2 — 600B

- Device I/F Address (IPv4, Physical Address) ← 611
  - 192.168.1.20/24, 00:00:00:00:00:14
- L3RSW I/F Address (IPv4, Physical Address) ← 612
  - LAN I/F – 192.168.1.2/24, 00:00:00:00:00:02
  - Internal I/F – 192.168.1.2/32, <LAN I/F>
  - Wireless I/F – 172.16.1.2/24, 00:00:00:01:01:02
- Local Cache (learned via LAN I/F) ← 613
  - 192.168.1.20, 00:00:00:00:14, dynamic
- Remote Cached (learned via distribution) ← 614
  - 192.168.1.10, 00:00:00:00:02, static
  - 192.168.1.30, 00:00:00:00:02, static
- Routing Table ← 615
  - 192.168.1.20/32 via LAN I/F, static ← 615A
  - 192.168.1.10/32 via 172.16.1.1, dynamic ← 615B
  - 192.168.1.30/32 via 172.16.1.3, dynamic ← 615C

CACHE/ROUTING TABLE OF L3RSW 3

- Device I/F Address (IPv4, Physical Address) ← 621
  - 192.168.1.30/24, 00:00:00:00:00:1E
- L3RSW I/F Address (IPv4, Physical Address) ← 622
  - LAN I/F – 192.168.1.3/24, 00:00:00:00:00:03
  - Internal I/F – 192.168.1.3/32, <LAN I/F>
  - Wireless I/F – 172.16.1.3/24, 00:00:00:01:01:03
- Local Cache (learned via LAN I/F) ← 623
  - 192.168.1.30, 00:00:00:00:1E, dynamic
- Remote Cached (learned via distribution) ← 624
  - 192.168.1.10, 00:00:00:00:03, static
  - 192.168.1.20, 00:00:00:00:03, static
- Routing Table ← 625
  - 192.168.1.30/32 via LAN I/F, static ─── 625A
  - 192.168.1.10/32 via 162.16.1.1, dynamic ─ 625B
  - 192.168.1.20/32 via 162.16.1.2, dynamic ─ 625C

FIG. 6C

| Field | Length (bits) | Description |
|---|---|---|
| Version | 4 | Message version. Initial = 1 |
| Flags | 4 | MSB to LSB: bit 3 to bit 0<br>Bits 3-1: Reserved<br>Bit 0: Set to 0: L3/L2 map lists are not compressed. Set to 1: L3/L2 map lists are compressed. |
| Total Length ←711 | 16 | Total length, including header expressed in the number of 32 bit words (double words) |
| L3 Address Length ←712 | 8 | The number of bytes for the L3 address length |
| L2 Address Length ←713 | 8 | The number of bytes for the L2 address length |
| Reserved ←714 | 24 | Reserved for future use |
| Signature Type ←715 | 16 | 0 – No signature at the end of the message<br>Non-zero – represents the type of secure signature at the end of the message |
| Originator List Count ←716 | 16 | The number of Originator's with L3/L2 mappings |

| Field | Length (bits) | Description |
|---|---|---|
| Originator L3 Address ~721 | variable | The originator's L3 address. Length determined in distribution message header. Padded out to a 32 bit boundary. |
| Originator L2 Address ~723 | variable | The originator's L2 address. Length determined in distribution message header. Padded out to a 32 bit boundary. |
| Sequence Number ~733 | 32 | Each L3 Routed Switch maintains a sequence number and monotonically increments the number each time there is an update to its local L3/L2 map. |
| List Count ~725 | 16 | Total Number of local L3/L2 addresses associated with the originator's LAN interface |
| Reserved ~727 | 16 | Reserved for future use. |
| Add/Remove Bitmap ~729 | variable | Bitmap for each entry in the L2/L3 address. Left most bit is associated with the first entry in the list. Padded out to 32 bit boundary.<br>0 – Remove Entry<br>1 – Add Entry |
| L2/L3 Address List ~731 | variable | The list of L3/L2 addresses specified by the List Count. These are the local L3/L2 addresses for the Originator L3/L2 address fields specified in record. |

METHOD FOR MOBILE AD-HOC NETWORK (MANET) MULTI-HOP ROUTING IN A BROADCAST DOMAIN

BACKGROUND

A communications network may include interconnected computing devices that can exchange data and share resources with each other. The computing devices may follow various rules and protocols that determine how data is routed between the computing devices. Some communications networks may include multiple constituent networks that utilize different physical media and/or protocols. In such communications networks, ensuring correct interoperability between the constituent networks is of vital importance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a first layer-3 switch, the method comprising: learning, by the first layer-3 switch, a first layer-3/layer-2 (L3/L2) cache, the learning of the first L3/L2 cache including generating a first cache entry that maps a layer-3 address of a first device to a layer-2 address of the first device, the first device being part of a first LAN portion; transmitting, over a wireless network, contents of the first L3/L2 cache to a second layer-3 switch, the transmitted contents including at least a portion of the first cache entry, the second layer-3 switch being part a second LAN portion, the second LAN portion being connected to the first LAN portion via the wireless network; receiving, by first the layer-3 switch, contents of a second L3/L2 cache that is learned by the second layer-3 switch, the received contents including at least a portion of a second cache entry that maps a layer-3 address of a second device to a layer-2 address of the second device, the second device being part of the second LAN portion; and storing at least a portion of the received contents into the first L3/L2 cache.

According to aspects of the disclosure, a system is provided, comprising: a memory; and a processing circuitry configured to perform the operations of: learning a first layer-3/layer-2 (L3/L2) cache, the learning of the first L3/L2 cache including generating a first cache entry that maps a layer-3 address of a first device to a layer-2 address of the first device, the first device being part of a first LAN portion; transmitting, over a wireless network, contents of the first L3/L2 cache to a layer-3 switch, the transmitted contents including at least a portion of the first cache entry; receiving contents of a second L3/L2 cache that is learned by the layer-3 switch, the received contents including at least a portion of a second cache entry that maps a layer-3 address of a second device to a layer-2 address of the second device, the second device being part of a second LAN portion, the second LAN portion being connected to the first LAN portion via the wireless network; and storing at least a portion of the received contents into the first L3/L2 cache.

According to aspects of the disclosure, a non-transitory computer-readable medium storing one or more processor-executable instructions, which, when executed by at least one processor of a first layer-3 switch, cause the at least one processor to perform the operations of: learning a first layer-3/layer-2 (L3/L2) cache, the learning of the first L3/L2 cache including generating a first cache entry that maps a layer-3 address of a first device to a layer-2 address of the first device, the first device being part of a first LAN portion; transmitting, over a wireless network, contents of the first L3/L2 cache to a second layer-3 switch, the transmitted contents including at least a portion of the first cache entry, the second layer-3 switch being part a second LAN portion, the second LAN portion being connected to the first LAN portion via the wireless network; receiving contents of a second L3/L2 cache that is learned by the second layer-3 switch, the received contents including at least a portion of a second cache entry that maps a layer-3 address of a second device to a layer-2 address of the second device, the second device being part of a second LAN portion; and storing at least a portion of the received contents into the first L3/L2 cache.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 6A is a schema of the contents of a cache and a routing table, according to aspects of the disclosure;

FIG. 6B is a schema of the contents of a cache and a routing table, according to aspects of the disclosure;

FIG. 6C is a schema of the contents of a cache and a routing table, according to aspects of the disclosure;

FIG. 7B is a diagram of a header of an advertisement message, according to aspects of the disclosure; and FIG. 7C is a diagram of an originator list, according to aspects of the disclosure.

DETAILED DESCRIPTION

Figure 1:
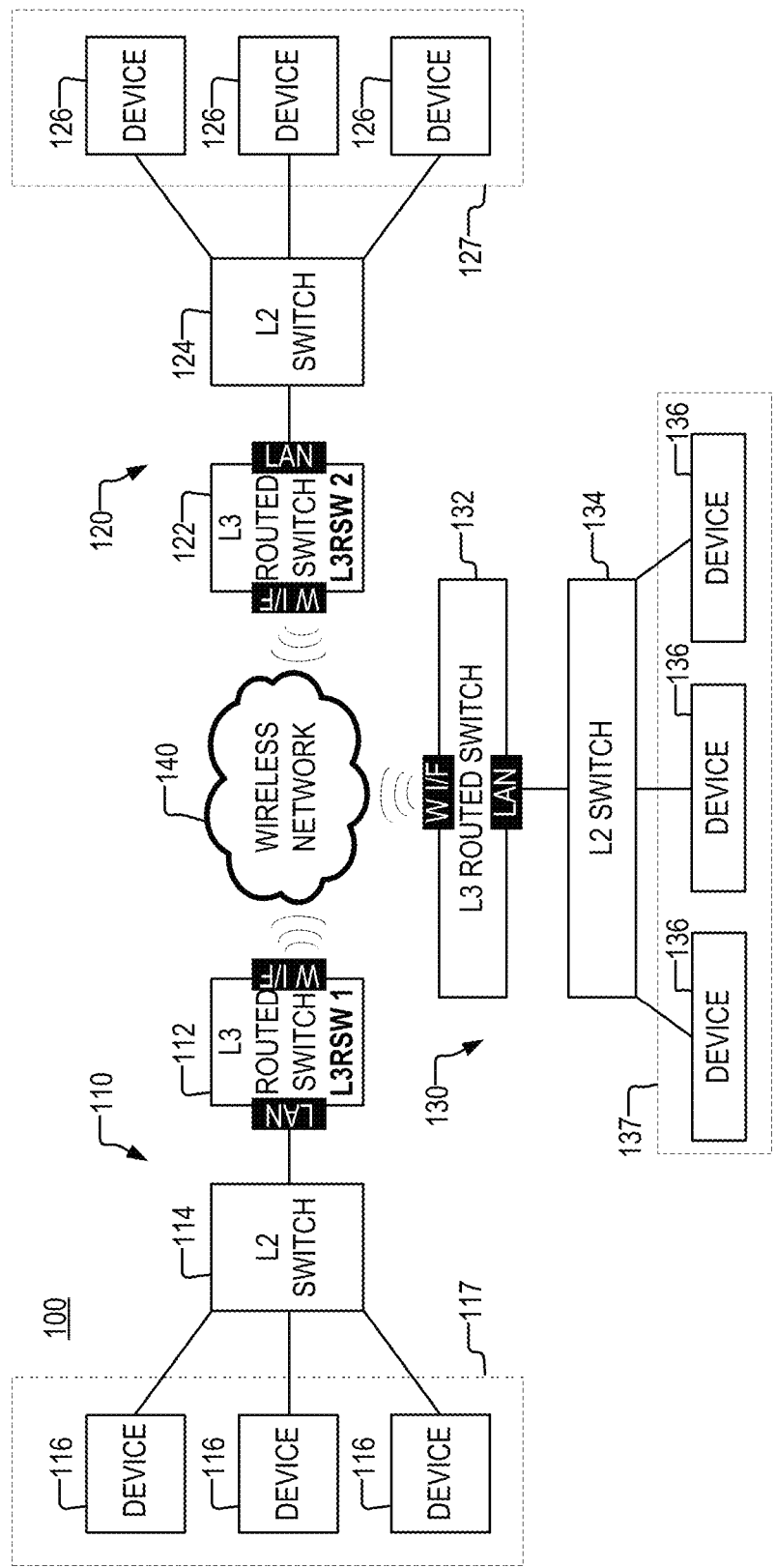
FIG. 1 is a diagram of an example of a system, according to aspects of the disclosure.

FIG. 1 is a diagram of a system 100, according to aspects of the disclosure. The system 100 may include networks 110, 120, and 130, which are coupled to one another, at least in part, via a wireless network 140. According to the present example, the wireless network 140 includes a mobile network (e.g., a 5G network, etc.). According to the preset example, each of the networks 110, 120, and 130 includes local area network (LAN) and/or an Ethernet network. However, it will be understood that the present disclosure is not limited to any specific technology for implementing the wireless network 140 and/or the networks 110, 120, and 130.

Network 110 may include a layer-3 routed switch 112, a layer-2 switch 114, and a set 117 of devices 116. Each of devices 116 may include a desktop computer, a laptop computer, a smartphone, a tablet, an internet-of-things (IoT) device, a layer-3 routed switch having its own subnetwork behind it, and/or any other suitable type of electronic device. Switch 112 may be coupled to devices 116 via a local area network (LAN) interface. Switch 112 may be connected to the wireless network 140 via a wireless interface. As used throughout the disclosure, the abbreviation "I/F" means interface. As used herein, the terms "layer-2" and "layer-3" refer to the layers of the open systems interconnect (OSI) stack.

Network 120 may include a layer-3 routed switch 122, a layer-2 switch 124, and a set 127 of devices 126. Each of the devices 126 may include a desktop computer, a laptop computer, a smartphone, a tablet, an internet-of-things (IoT) device, a layer-3 routed switch having its own subnetwork behind it, and/or any other suitable type of electronic device. Switch 122 may be coupled to devices 126 via a local area network (LAN) interface. Switch 122 may be connected to the wireless network 140 via a wireless interface.

Network 130 may include a layer-3 routed switch 132, a layer-2 switch 134, and a set 137 of devices 136. Each of devices 136 may include a desktop computer, a laptop computer, a smartphone, a tablet, an internet-of-things (IoT) device, a layer-3 routed switch having its own subnetwork behind it, and/or any other suitable type of electronic device. Switch 132 may be coupled to devices 136 via a local area network (LAN) interface. Switch 132 may be connected to the wireless network 140 via a wireless interface. According to the present example, LANs 110, 120, and 130 are on the same subnet, such that any device that is behind one of L3 switches 112, 122, and 132 has a unique IP address across all of LANs 110, 120, and 130. In other words, in some implementations, no device in any of LANs 110, 120, and 130 may have the same IP address as another device in any of LANs 110, 120, and 130. In this regard, under the nomenclature of the present disclosure, LANs 110, 120, and 130 may also be referred to as different portions of the same LAN.

Figure 2:
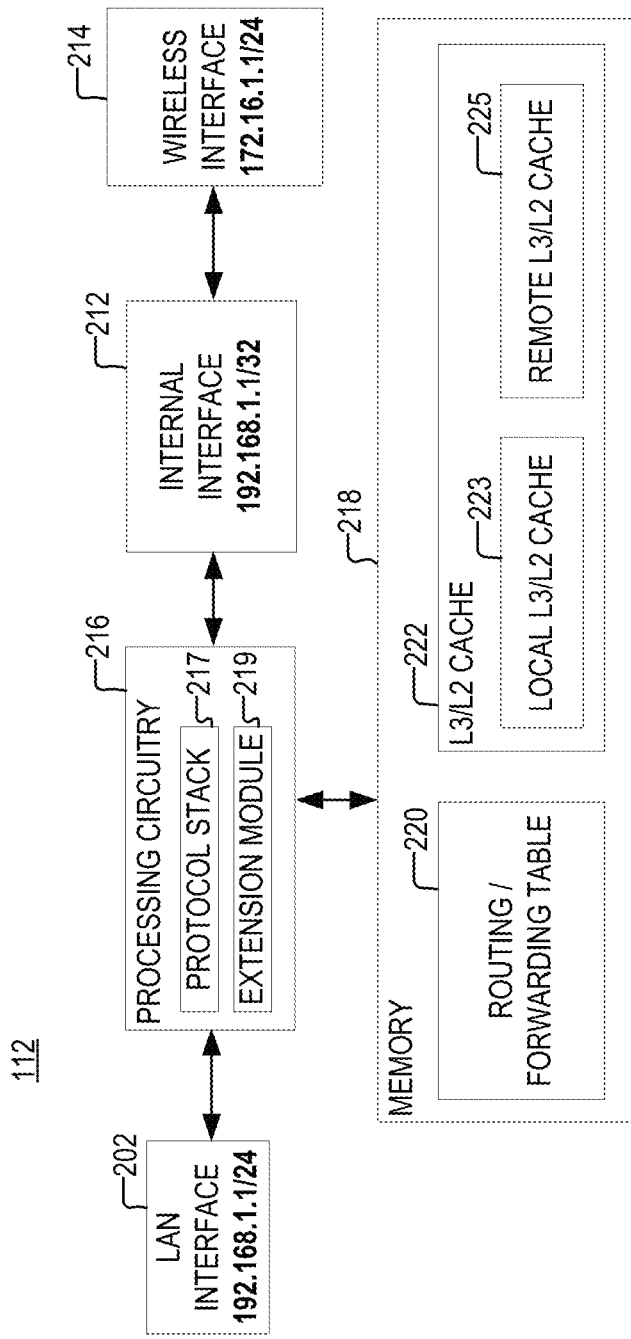
FIG. 2 is a diagram of an example of a layer-3 routing switch, according to aspects of the disclosure.

FIG. 2 is a diagram of an example of one possible configuration of switch 112, according to aspects of the disclosure. As illustrated, switch 112 may include a LAN interface 202, a wireless interface 214, an internal interface 212, a processing circuitry 216, and a memory 218. The respective layer-3 address (i.e., the IP address) of each of the LAN interface 202, the internal interface 212, and the wireless interface is shown in FIG. 2. Specifically, the IP address of the LAN interface is "192.168.1.1/24", the IP address of the internal interface 212 is "192/168.1.1/32", and the IP address of the wireless interface 214 is "172.16.1.1/24".

According to the present example, the LAN interface 202 includes an Ethernet adapter. Furthermore, according to the present example, interface 202 is a wired interface. However, it will be understood that the present disclosure is not limited to any specific implementation of interface 202. According to the present example, the wireless interface 214 is a 5G wireless interface. However, it will be understood that the present disclosure is not limited to any specific implementation of the wireless interface. For example, in some implementations, the wireless interface may include an 802.11 interface, a Bluetooth interface, a Zigbee interface, a Z-wave interface, and/or any other suitable type of wireless interface.

The internal interface 212 may be configured to forward packets or other data that is received from any of devices 116 on the LAN interface 202 to the wireless interface 214 for transmission, over the wireless network 140, to any of devices 126 and 136. The internal interface 212 may be further configured to forward packets or other data that is received on the wireless interface 214 from any of devices 126 and 136 to the LAN interface 202 for transmission to any of devices 116. In some implementations, the internal interface 212 may be implemented as a separate hardware device (e.g., as a separate electronic circuit or a separate chip). Additionally or alternatively, in some implementations, the internal interface 212 may be implemented as an electronic circuit that is integrated into one of LAN interface 202, wireless interface 214, and/or the processing circuitry 216. Additionally or alternatively, in some implementations, the internal interface 212 may be implemented as a virtual device and/or an object/process that is executed on the processing circuitry 216. Additionally or alternatively, in some implementations, the internal interface 212 may be an Ethernet interface. Additionally or alternatively, in some implementations, the internal interface 212 may support the same protocol or protocol stack as interface 202 and/or wireless interface 214.

The processing circuitry 216 may include one or more of a general-purpose processor (e.g., a MIPS processor), a special-purpose processor, an application-specific integrated circuit (ASIC), a field-programmable gate array (FPGA), and/or any other suitable type of processing circuitry. The processing circuitry 216 may be configured to perform address resolution (e.g., by executing the address resolution protocol (ARP)), execute routing protocols and algorithms, and/or execute any other method or algorithm that is normally used by layer-3 switches. The memory 218 may include any suitable type of volatile or non-volatile memory, such as a cache memory provided on the die of the processing circuitry 216, a synchronous dynamic random-access memory (SDRAM), an electronically erasable programmable read-only memory (EEPROM), etc.

The processing circuitry 216 may execute a protocol stack 217 and an extension module 219. The protocol stack 217 may implement at least the first three layers of the Open Systems Interconnect (OSI) model. However, the present disclosure is not limited to any specific implementation of the protocol stack 217. In one aspect, the module 219 may be arranged to enable devices 126 to discover the layer-2 addresses of devices 116 as if the devices 116 were on the same Ethernet with devices 126. In another aspect, the module 219 may be arranged to enable devices 136 to discover the layer-2 addresses of devices 116 as if the devices 136 were on the same Ethernet with the devices 116. In yet another aspect, the module 219 may be arranged to enable devices 126 to transmit to devices 116 Ethernet broadcast messages as if the devices 126 were on the same Ethernet with the devices 116. In yet another aspect, the module 219 may be arranged to enable devices 126 to receive Ethernet broadcast messages from devices 116 as if the devices 116 were on the same Ethernet with devices 126.

According to the example of FIG. 2, the module 219 is provided separately from the protocol stack 217. Furthermore, according to the example of FIG. 2, the module 219 is arranged to seamlessly extend the capabilities of the protocol stack 217 (as well as the protocol stacks of switches 122 and 132) (e.g., by monitoring the state of the local L3/L2 cache 223) to create the impression of uninterrupted Ethernet continuity across networks 110, 120, 130. However, it will be understood that alternative implementations are possible in which the module 219 is integrated into the protocol stack 217. According to the present example, module 219 is implemented in software. However, alternative implementations are possible in which module 219 is implemented in hardware or as a combination of hardware and software.

The memory 218 may be provided as a separate device and/or integrated into one or more of LAN interface 202, the processing circuitry 216, internal interface 212, and/or wireless interface 214. The memory 218 may store a routing table 220 and an L3/L2 cache 222. The L3/L2 cache may include a plurality of entries. Each entry may map the layer-3 address (i.e., the IP address) of a device to the layer-2 address (i.e., the MAC address) of the same device. The acronyms "L2" and "L3" as used in the term "L3/L2 cache" refer to the second and third layers of the OSI stack, and they are not intended to refer to specific types of secondary or tertiary caches that are available in many microprocessor architectures. In other words, the acronym "L3/L2" describes the data that is being cached, rather than the memory where the data is cached.

In one example, the L3/L2 cache 222 may include a local L3/L2 cache 223 and a remote L3/L2 cache 225. The local L3/L2 cache 223 may include one or more first entries (e.g., see L3/L2 map 603A shown in FIG. 6A). The remote L3/L2 cache may include a plurality of second entries (e.g., see L3/L2 maps 604A-B shown in FIG. 6A). Each first entry may map the IP address of one of the devices 116 to the same device's MAC address. Each second entry may map the IP address of one of the devices 126 and 136 to the MAC address of the LAN interface 202. The second entries may be provided by switch 112 to devices 116. When received at devices 116, the second entries may cause devices 116 to forward any packets for devices 126 and 136 to the LAN interface 202 for further transmission to the packets' final destinations. Under the nomenclature of the present disclosure, the first and second entries may also be referred to as "L3/L2 maps".

Figure 3:
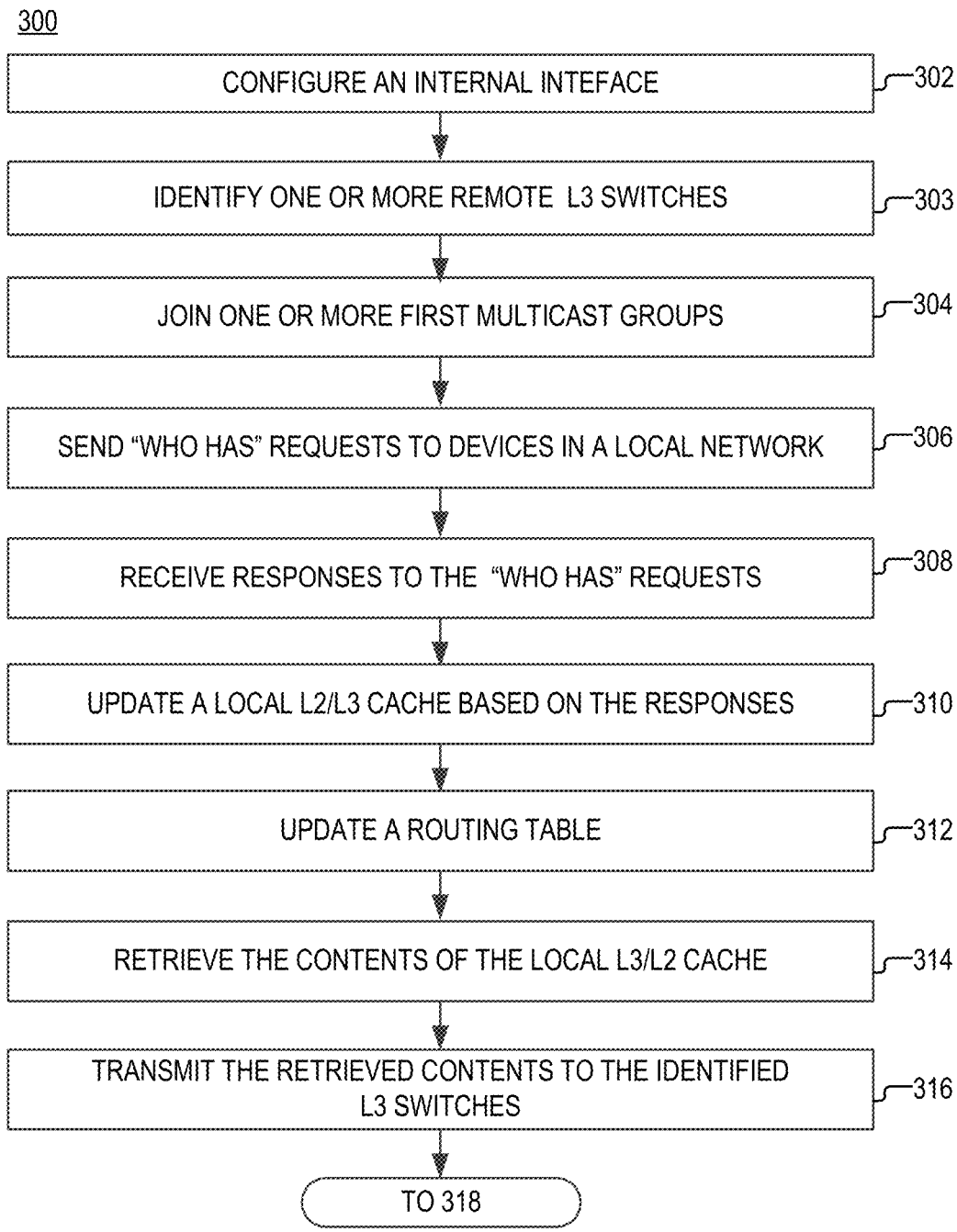
FIG. 3 is a flowchart of an example of a process, according to aspects of the disclosure.
Figure 4:
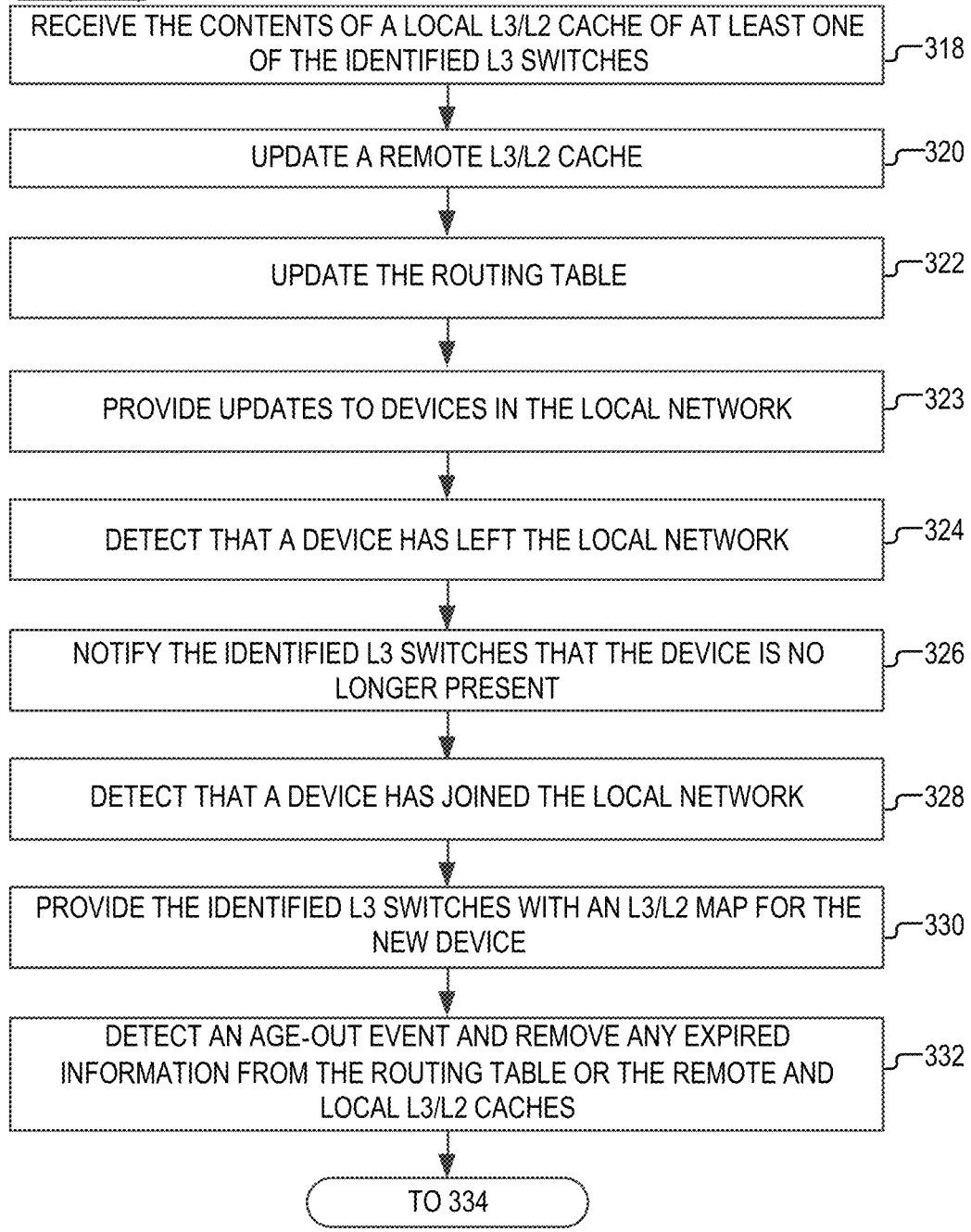
FIG. 4 is a flowchart of an example of a process, according to aspects of the disclosure.
Figure 5:
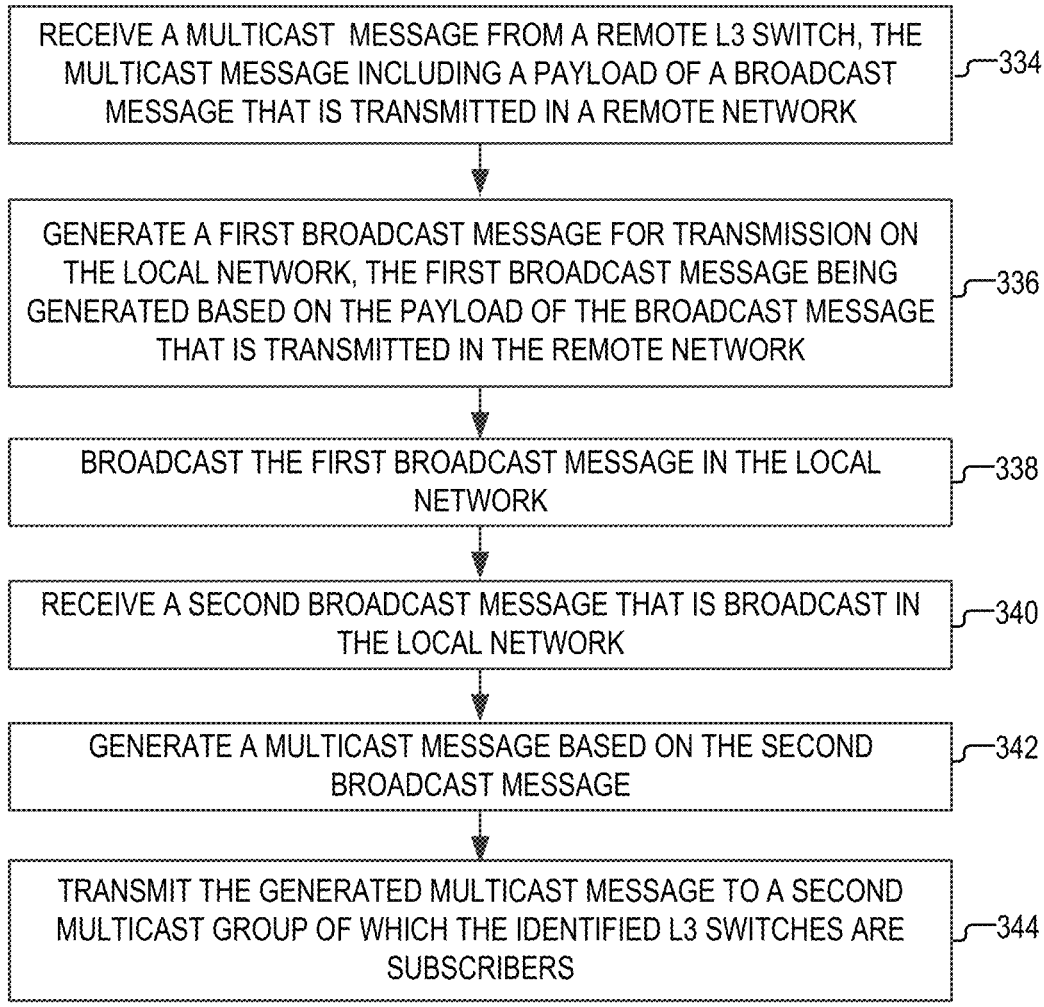
FIG. 5 is a flowchart of an example of a process, according to aspects of the disclosure.

FIGS. 3-5 show a flowchart of an example of a process 300, according to aspects of the disclosure. In the example of FIGS. 3-5, each of the steps in process 300 is performed by module 219 and/or switch 112. However, the present disclosure is not limited to any entity performing any of the steps in process 300.

At step 302, switch 112 (and/or module 219) configures the internal interface 212. In some implementations, configuring the internal interface 212 may include assigning, to the internal interface 212, an IP address that is part of the IP address domain of the LAN interface 202 (and/or the network 110)—i.e., an IP address that identifies a host within the network it is attached to. In the example, of FIG. 1, the address domain of the LAN interface is "192.168.1.1/24" and interface 212 is assigned an IP address "192.168.1.1/32". Additionally or alternatively, in implementations in which the internal interface 212 is implemented as a virtual device and/or software object, configuring the internal interface 212 may include instantiating the internal interface. Additionally or alternatively, in some implementations, configuring the internal interface 212 may include providing the newly-assigned IP address of the internal interface 212 to the wireless interface 214.

At step 303, switch 112 (and/or module 219) identifies one or more level-3 switches that are separated from switch 112 by the wireless network 140. According to the present example, switches 122 and 132 are identified. In some implementations, identifying the switches may include retrieving identifiers corresponding to the switches from the memory 218. Additionally or alternatively, in some implementations, identifying the switches may include executing a discovery handshake with switches 122 and 132.

At step 304, switch 112 joins one or more first multicast groups. Specifically, switch 112 may join a first multicast group that is maintained (or otherwise used) by switch 122 to relay over the wireless network 140 Ethernet broadcast messages that are broadcast within the network 120. Additionally or alternatively, switch 112 may join another first multicast group that is maintained (or otherwise used) by switch 132 to relay over the wireless network 140 Ethernet broadcast messages that are broadcast within the network 130. In some implementations, joining the first multicast groups may cause switches 122 and 132 to transmit to switch 112 Ethernet broadcast messages which are broadcast internally within networks 120 and 130, and would normally be contained within the networks 120 and 130 by the Ethernet protocol. In some implementations, the first multicast groups may be defined in a configuration file that is accessible by the switch 112. The configuration file may be stored in the memory of the switch 112 or in the memory of another device.

At step 306, a "who has" request is sent from switch 112 to any of the devices that are part of the local area network of switch 112 (i.e., the network 110). In the present example, the local area network of switch 112 has an IP address domain of "192.168.1.1/24" and the devices that are part of the local network are devices 116. Devices 116 are assigned IP addresses that are part of the IP address domain of switch 112. In some implementations, the "who has" request may include an address resolution protocol (ARP) request. In some implementations, at step 306, switch 112 may send an ARP request to each (or at least one or more) of the IP addresses in the IP address domain of switch 112.

At step 308, switch 112 receives responses to the "who has" requests. Each response may be received from a different one of devices 116 and include that device's respective MAC address.

At step 310, switch 112 populates the local L3/L2 cache 223 based on the responses received at step 308. For each received response, switch 112 may generate an L3/L2 map that maps the IP address of the sender of the response to the MAC address of the sender.

At step 312, switch 112 populates the routing table 220 based on the responses received at step 308. For each received response, switch 112 may create an entry in the routing table 220 that maps the IP address of the sender of the response to an identifier of the LAN interface 202. The created entry may be static. An example of a static routing table entry that can be created at step 312 is the entry 605A, which is shown in FIG. 6A.

At step 314, the contents of the local L3/L2 cache 223 are retrieved by module 219.

At step 316, module 219 transmits the contents of the local L3/L2 cache 223 to the switches identified at step 303 (i.e., switches 122 and 132). The transmission is performed by using wireless interface 214 (shown in FIG. 2). In some implementations, the contents of the local L3/L2 cache 223 may be transmitted in an advertisement message, such as the message 700, which is discussed further below with respect to FIGS. 7A-C.

At step 318, switch 112 (and/or module 219) receives (via wireless interface 214) a message containing the local L3/L2 cache of one of the switches identified at step 303. In the present example, the message includes the contents of the local cache of switch 122. The message is received from switch 122. The message includes one or more L3/L2 maps that are stored in the local L3/L2 cache of switch 122. Each L3/L2 map relates (or maps) the IP address of a different one of the devices 126 to the MAC address of the device. In some implementations, the message may be an advertisement message, such as the message 700, which is discussed further below with respect to FIGS. 7A-C. The present example assumes that switch 122 in has the same configuration/architecture as switch 112 (e.g., the configuration/architecture that is shown in FIG. 2).

At step 320, module 219 updates the remote L3/L2 cache 225 based on the contents of the message (received at step 320). Specifically, for each of the L3/L2 maps received at step 318, the module 119 may perform the following steps: (i) retrieve an L3/L2 map that is part of the message, (ii) replace, in the retrieved L3/L2 map, the MAC address of the corresponding device 126 with the MAC address of the LAN interface 202, and (iii) store the resulting L3/L2 map in the remote L3/L2 cache 225. Each of the generated L3/L2 maps may be the same or similar to the entries 604A-B, which are shown in FIG. 6A.

At step 322, module 219 updates the routing table 220 based on the contents of the message (received at step 320). Specifically, for each of the L3/L2 maps received at step 318, the module 119 may generate a corresponding routing table entry, wherein the routing table entry includes (a) the IP address of the entry's corresponding device 126 (within the network of the switch from which the L3/L2 map is received) and (b) the IP address of switch 122 (i.e., the IP address of the switch from the L3/L2 map is received). An example of a routing table entry that can be created in response to receiving an L3/L2 map from switch 122 is the entry 605B, which is shown in FIG. 6B.

At step 323, module 219 (and/or switch 112) provides the entries that were added to the remote L3/L2 cache 225 at step 320 to all (or one or more) of the devices 116.

At step 324, module 219 detects that a given one of the devices 116 has left the network 110 and is no longer available to receive data. In one particular example, module 219 executes step 324 by passively monitoring the contents of the local L3/L2 cache 223 and detecting when the L3/L2 map corresponding to any of the devices 116 is removed from the local L3/L2 cache. In other words, in the present example, the deletion of an L3/L2 map that corresponds to one of devices 116 may signal the module 219 that the device 116 is no longer available. In some implementations, the passive monitoring of the contents of the L3/L2 cache may be accomplished by the module 219 listening to ARP messages and responses that are sent by devices 116 rather than using the module 219 to send the messages. Alternatively, the passive monitoring of the contents of the L3/L2 cache may be accomplished by periodically examining the contents of the L3/L2 cache. As can be readily appreciated, the L3/L2 cache may be updated based on the contents of ARP messages or ARP message responses that are exchanged between the switch 112 and the devices 116.

Figure 7A:
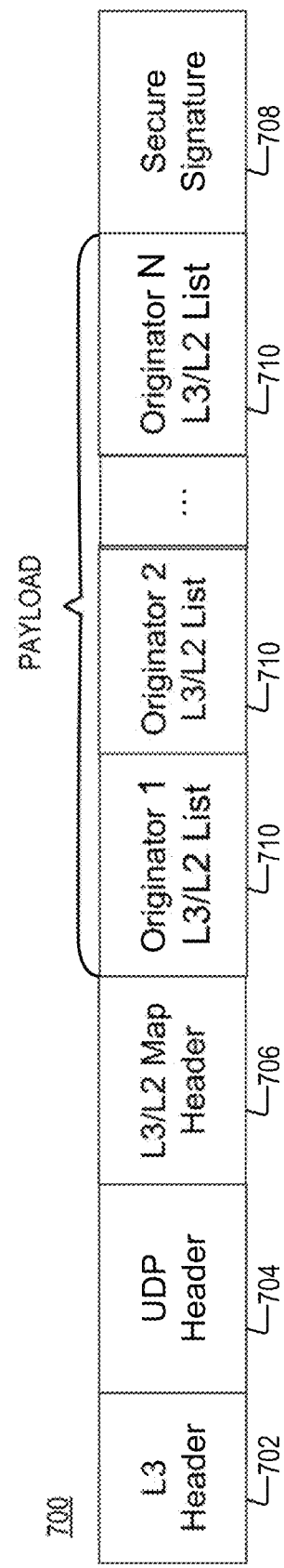
FIG. 7A is a diagram of an advertisement message, according to aspects of the disclosure.

At step 326, switch 112 notifies switches 122 and 132 that the given device 116 is no longer available. In response to receiving the notification, switches 122 and 132 may delete any entries corresponding to the given device 116 from their respective remote L3/L2 caches and routing tables. In some implementations, the notification may be provided in an advertisement message, such as the message 700, which is discussed further below with respect to FIGS. 7A-C. In some implementations, the notification may include the L3/L2 map with the addresses of the device that has left the network along with an indication that this L3/L2 map needs to be removed. (e.g., see bitmap 729 that is shown in FIG. 7C).

At step 328, switch 112 (and/or module 219) detects that a new device has joined the network 110. In one particular example, module 219 executes step 324 by passively monitoring the contents of the local L3/L2 cache 223 and detecting when the L3/L2 map corresponding to a new device has been added to the local L3/L2 cache 223. In other words, in the present example, the addition of an L3/L2 map that corresponds to an unfamiliar device may signal the module 219 that a new device has been added to the network of switch 112 (e.g., added to set 117).

At step 330, switch 112 (and/or module 219) provides the newly-added L3/L2 map (detected at step 328) to switches 122 and 132 (i.e., to the switches identified at step 303). When the entry is received at switches 122 and 132, the switches 122 and 132 may process the entry as discussed above with respect to step 320. In some implementations, the newly-added map may be provided in an advertisement message, such as the message 700, which is discussed further below with respect to FIGS. 7A-C. In some implementations, the switch 112 may wait for a certain number of device removals and/or additions to accumulate before generating and sending the advertisement message.

At step 332, switch 112 detects an age-out event and deletes from the L3/L2 cache 222 or routing table 220 any expired information that is associated with the age-out event.

At step 334, switch 112 receives a multicast message from switch 122. The multicast message is transmitted by switch 122 to one of the first multicast groups, which switch 112 is subscribed to at step 304. Subscribing to the first multicast groups effectively enables switch 112 to receive Ethernet broadcast messages that would normally be local to the networks 120 and 130. The payload of the multicast message includes at least a part of the payload of an Ethernet broadcast message that is broadcast within the network 120 by one of devices 126. This Ethernet broadcast message is herein referred to as "original Ethernet broadcast message".

At step 336, switch 112 generates an Ethernet broadcast message based on the multicast message (received at step 334). The payload of the generated Ethernet broadcast message may be the same as the original Ethernet broadcast message. The generated Ethernet broadcast message may be generated by instantiating a blank Ethernet broadcast message and copying the payload (or portion thereof) of the original Ethernet broadcast message into the blank Ethernet broadcast message.

At step 338, the Ethernet broadcast message (generated at step 336) is broadcast in network 110 by switch 112.

At step 340, switch 112 receives an Ethernet broadcast message. The received Ethernet broadcast message is broadcast by one of devices 116 in the network 110. The received broadcast message, in this example, is unrelated to the broadcast messages discussed with respect to steps 334 and 336.

At step 342, switch 112 generates a multicast message based on the received Ethernet broadcast message. Generating the multicast message may include instantiating a blank multicast message and copying at least some (or all) of the payload of the Ethernet broadcast message (received at step 340) into the blank multicast message.

At step 344, switch 112 transmits the multicast message (generated at step 342) to a second multicast group of which switches 122 and 132 (i.e., the switches identified at step 203) are subscribers. The second multicast group may be managed by switch 112 or by another entity. Subscribing to the second multicast group effectively enables the switches 122 and 132 to receive Ethernet broadcast messages whose distribution would otherwise be limited to the network 110. In some implementations, the second multicast group may be defined in a configuration file that is accessible by the switch 112. The configuration file may be stored in the memory of the switch 112 or in the memory of another device.

FIGS. 3-5 are provided as an example only. At least some of the steps discussed with respect to FIGS. 3-5 can be performed in a different order, performed in parallel, or altogether omitted. In the example of FIGS. 3-5, steps 306-310 represent a standard method for learning the L3/L2 cache of a switch, which (in one example) may be performed by the protocol stack 217 (shown in FIG. 2). Steps 314-316 and 324-330 are performed by module 119 so that the switches 122 and 132 (i.e., the switches identified at step 303) can learn the L2 addresses of the devices in network 110. Steps 318-322 are performed so that switch 112 can learn the L2 address of the devices in networks 120 and/or 130. The approach to learning an L3/L2 cache an example of which is provided in steps 314-316 is also referred to as "learning via LAN interface". The approach to learning an L3/L2 cache an example of which is provided in steps 314-316, 324-330 and 318-322 may also be referred to as "learning via distribution." Learning via LAN interface is performed by conventional systems, and is limited to learning the L2 address of devices that are located on the same network. In general, the methods for learning via distribution that are practiced by conventional system would be unable to discover the L2 address of devices that are located in disjoint networks (e.g., wired Ethernet networks that are accessible via a wireless network, etc.) In contrast to conventional devices, the switch 112 practices learning via distribution in addition to learning via LAN, which enables the switch 112 to learn the L2 addresses of devices that are in networks 120 and 130 (or other disjoint networks). This in turn enables switch 112 to treat networks 110, 120, and 130 as one large network, rather than three disjoint networks that are connected via a wireless network.

In one aspect, the techniques discussed with respect to FIGS. 3-5 are advantageous because they do away with the need to forward address resolution traffic originating from any of devices 116, 126, and 136 on the wireless network 140. In the example of FIGS. 3-5, the address resolution traffic is replaced with controlled "learning via distribution" messages, such as message 700 which shown in FIG. 7.

In another respect, the techniques discussed with respect to FIGS. 3-5 are advantageous because they do away with the need to send out-of-network L2 headers and trailers in messages that are sent over the wireless network 140 from a device in one of the LANs 110, 120, and 130 to another device in a different one of the LANs 110, 120, and 130. For example, although a message sent from LAN 110 to LAN 120 may include L2 headers that are necessary for the transmission of the message across wireless network 140, the message would not need to carry additional L2 headers/trailers that are necessary from the transmission of the message across LAN 120. Because each of the L3 switches 112, 122, and 132 provides (at least a portion of) the contents of its L3/L2 cache to the remaining ones of switches 112, 122, 132, each of the switches 112, 122, and 132 can carry MAC address resolution locally, without having to resort messages over the wireless network 140.

In yet another aspect, the techniques discussed with respect to FIGS. 3-5 are advantageous because they reduce the amount of data that needs to be carried by the wireless network 140 when one of the devices 116, 126, and 136 transmits a broadcast message. In the example of FIGS. 3-5, broadcast traffic that would normally be sent over the wireless network is now controlled by using multicast groups, which avoids sending the Ethernet header/trailer per broadcast message over the wireless network 140. The table below shows the savings in data traffic that are realized from not having to send the Ethernet header/trailer for different IP packet and Ethernet frame sizes.

| USER DATA SIZE | IP PACKET SIZE | ETHERNET FRAME SIZE | % SAVINGS |
| --- | --- | --- | --- |
| 64 B | 92 B | 110 B | −20% |
| 128 B | 156 B | 174 B | −11% |
| 512 B | 540 B | 558 B | 3% |

FIGS. 6A-C show schemas 600A-C. Schema 600A shows the content of the routing table 220, local L3/L2 cache 223, and remote L3/L2 cache of switch 112. Schema 600B shows the content of the routing table, local L3/L2 cache, and remote cache of switch 122. Schema 600C shows the content of the routing table, local L3/L2 cache, and remote cache of switch 132. For simplicity, the example of FIGS. 6A-C assumes that each of sets 117, 127, and 137 includes one device only. The IP address of the device 116 in set 117 is "192.10.1.10/24", the IP address of the device 126 in set 127 is "192.168.1.20/24", and the IP address of the device 136 in set 137 is "192.168.1.30/24". The IP address of the wireless interface of switch 112 is "172.16.1.1", the IP address of the wireless interface of switch 122 is "172.16.1.2", and the IP address of the wireless interface of switch 132 is "172.16.1.3". The examples provided throughout the disclosure assume that switches 112, 122, and 132 have identical configurations/architectures (e.g., see the configuration/architecture shown in FIG. 2). However, the concepts and ideas presented throughout the disclosure are not limited to switches 112, 122, and 132 being identical.

Schema 600A includes sections 601-605. Section 601 identifies the IP address of the device 116 which is part of set 117. Section 602 identifies the respective IP and MAC address of each of the LAN interface 202, internal interface 212, and wireless interface 214.

Section 603 identifies the contents of the local L3/L2 cache 223. Section 603 may include an L3/L2 map 603A. As illustrated, L3/L2 map 603A maps the IP address of the device 116 in set 117 to the device's 116 MAC address. Section 603 further illustrates that the L3/L2 map in section 603 is dynamic.

Section 604 shows the contents of the remote L3/L2 cache 225. As illustrated, the remote cache 224 may include L3/L2 maps 604A and 604B. L3/L2 map 604A maps the IP address of the device 126 in set 127 to the MAC address of interface 202. L3/L2 map 604B maps the IP address of the device 136 in set 137 to the MAC address of the LAN interface 202. When L3/L2 maps 604A and 604B are disseminated by switch 112 among the device(s) 116 in set 117, the L3/L2 maps 604A and 604B would cause the messages whose end recipients are device 126 or device 136 to be sent to the LAN interface 202 of switch 112 first, from where they can proceed to their final destination.

Section 605 shows the contents of routing table 220. As illustrated, routing table 220 may include entries 605A-C. Entry 605A may map the IP address of the device 116 in set 117 to an identifier of the LAN interface 202. Entry 605B maps the IP address of the device 126 in set 127 to the IP address of the wireless interface of switch 122. Entry 605B maps the IP address of the device 136 in set 137 to the IP address of the wireless interface in switch 132. As can be readily appreciated, entries 605A-C would cause the processing circuitry 216 of switch 112 to: route any packets for the device 116 to the LAN interface 202, route any packets for the device 126 to the wireless interface of switch 122; and route any packets for the device 136 to the wireless interface of switch 132.

In the example of FIG. 6A, entry 605A is static and entries 605B-C are dynamic. The static entry 605A may be added to the routing table by extension module 219 when performing the local cache discovery. The dynamic entries 605B-C may be learned by the dynamic routing protocol (in 217) and installed in the routing table. The static entry 605A allows the dynamic routing protocol in 217 to learn about the locally added static route and advertise the static route to other neighboring nodes running the same dynamic routing protocol.

Schema 600B includes sections 611-615. Section 611 identifies the IP address of the device 126 which is part of set 127 (shown in FIG. 1). Section 612 identifies the respective IP and MAC addresses of the LAN interface, internal interface, and wireless interface of switch 122. Section 613 identifies the contents of the local L3/L2 cache of switch 122. Section 614 shows the contents of the remote L3/L2 cache of switch 122. Section 615 shows the content of the routing table of switch 122. The routing table of switch 122 may include entries 615A-C. Entry 615A maps the IP address of the device 126 in set 127 to an identifier of the LAN interface of switch 122. Entry 615B maps the IP address of the device 116 in set 117 to the IP address of the wireless interface 214 of switch 112. Entry 615C maps the IP address of the device 136 in set 137 to the IP address of the wireless interface in switch 132.

Schema 600C includes sections 621-625. Section 621 identifies the IP address of the device 136 which is part of set 137 (shown in FIG. 1). Section 622 identifies the respective IP and MAC addresses of the LAN interface, internal interface, and wireless interface of switch 122. Section 623 identifies the contents of the local L3/L2 cache of switch 132. Section 624 shows the contents of the remote L3/L2 cache of switch 132. Section 625 shows the content of the routing table of switch 122. The routing table of switch 122 may include entries 625A-C. Entry 625A maps the IP address of the device 136 in set 137 to an identifier of the LAN interface of switch 132. Entry 625B maps the IP address of the device 116 in set 117 to the IP address of the wireless interface 214 of switch 112. Entry 625C maps the IP address of the device 126 in set 127 to the IP address of the wireless interface in switch 122.

FIG. 7A is a diagram of an example of an L3/L2 map advertisement message 700. As illustrated, the message 700 may include a layer-3 header 702, a universal data protocol (UDP) header 704, an L3/L2 header 706, and a secure signature 708. The payload of the message 700 may include one or more originator lists 710. The secure signature 708 may be used to authenticate the payload.

Consider an example in which: (i) the advertisement message 700 includes only two originator lists, (ii) the advertisement message 700 is generated by switch 112, (iii) the advertisement message 112 is transmitted from switch 112 to switch 122, and (iv) one of the devices 116 is also an L3 switch having the same configuration as switch 112. In this example, one of the originator lists may be based on the contents of the (local) L3/L2 cache of the switch 112 and the other one of the originator lists may be based on the contents of the (local) L3/L2 cache of the device 116. When the originator list is transmitted (at step 316) after the initial learning performed by switch 112 (at steps 302-314), the first originator list may include the contents of the local L3/L2 cache 223. When the message 700 is generated in response to detecting that one or more new L3/L2 maps have been added to the L3/L2 cache 223 or in response to detecting that one or more L3/L2 maps have been deleted from the L3/L2 cache, the first originator list may include: (i) all L3/L2 maps in the local L3/L2 cache 223 that have been added to the L3/L2 cache since the last transmission of an advertisement message from switch 112 to switch 122, and/or (ii) all L3/L2 maps that have been deleted from the local L3/L2 cache 223. The second originator list may be an originator list that is generated by the device 116 in the same manner as the first originator list. The second originator list may be imported into the message 700 from another advertisement message that is transmitted from the device 116 to the switch 112. If the other message advertisement message includes originator lists from devices that are located further downstream from the device 116, those originator lists may also be imported in the message 700. In other words, in addition to containing an originator list that is generated by switch 112, the message 700 may include originator lists that are generated by devices downstream from the switch 112 (i.e., devices in LAN 110). Under the nomenclature of the present disclosure, switch 112 is the "originator" of the first originator list (because this originator list includes data is present in (or which has been removed from) the local L3/L2 cache of switch 112), and the device 116 is the "originator" of the second originator list (because this originator list includes data is present in (or which has been removed from) the local L3/L2 cache of the device 116). Although in the present example the message 700 includes multiple originator lists, alternative implementations are possible in which the message includes only the first originator list or only the second originator list.

FIG. 7B is a diagram of the header 706, according to aspects of the disclosure. The header 706 may include a "compressed" flag. The "compressed" flag indicates if the payload of the message 700 is compressed. The header 706 may further include fields 711-716. Field 711 identifies the total length of the message 700. Field 712 identifies the length of the L3 addresses that are identified in the originator lists 710. Field 713 identifies the length of the L2 addresses that are identified in the originator lists 710. Field 714 is reserved for future use. Field 715 identifies the type of the signature 708, if the signature 708 is at all present. Field 716 identifies the number of originator lists in the payload of message.

FIG. 7C shows an example of an originator list 750, according to aspects of the disclosure. The originator list 750 may be the same or similar to any of the originator lists 710, which are discussed with respect to FIG. 7A. The originator list 750 may include fields 721-733. Field 721 is the L3 address of the originator of the originator list 710. Field 723 is the L2 address of the originator of the originator list 710. Field 725 is the total count of L3/L2 addresses associated with the originator's LAN interface. Field 727 is reserved for future use. Field 729 is an add-remove bitmap. Field 731 is a set of one or more L3/L2 maps. And field 733 may be a sequence number. The sequence number may be similar to a TCP sequence number, and it may be used to identify the most recent advertisement message that is transmitted by a particular level-3 switch.

For each L3/L2 map in field 729 there may be a corresponding bit in the add-remove bitmap 729. For example, the first bit in the add-remove bitmap 729 may correspond to the first L3/L2 map in field 731, the second bit in the add-remove bitmap 729 may correspond to the second L3/L2 map in field 731, the third bit in the add-remove bitmap 729 may correspond to the third L3/L2 map in field 731, and so forth. Consider Consider an example in which the message 700 is received at switch 122. Switch 122 may retrieve each originator list 710 that is part of the message 700 and process the originator list 710 as follows. Specifically, for each of the L3/L2 maps in the retrieved originator list, switch 112 may perform the following steps: (i) retrieve the L3/L2 map, (ii) identify a bit in the add-remove bitmap 729 that corresponds to the retrieved L3/L2 map, (iii) if the bit is set to '0' delete the retrieved L3/L2 map from the (remote) L3/L2 cache of switch 122, and (iv) otherwise, if the bit is set to '1' add the retrieved L3/L2 map to the (remote) L3/L2 cache of switch 122.

FIGS. 1-7C are provided as an example only. At least some of the steps discussed with respect to FIGS. 1-7C may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a first layer-3 switch, the method comprising:
   learning, by the first layer-3 switch, a first layer-3/layer-2 (L3/L2) cache, the learning of the first L3/L2 cache including generating a first cache entry that maps a layer-3 address of a first device to a layer-2 address of the first device, the first device being part of a first LAN portion;
   transmitting, over a wireless network, contents of the first L3/L2 cache to a second layer-3 switch, the transmitted contents including at least a portion of the first cache entry, the second layer-3 switch being part a second LAN portion, the second LAN portion being connected to the first LAN portion via the wireless network;
   receiving, by first the layer-3 switch, contents of a second L3/L2 cache that is learned by the second layer-3 switch, the received contents including at least a portion of a second cache entry that maps a layer-3 address of a second device to a layer-2 address of the second device, the second device being part of the second LAN portion; and
   storing at least a portion of the received contents into the first L3/L2 cache.

2. The method of claim 1, wherein:
   the first L3/L2 cache is stored in a first memory of the first layer-3 switch;
   the second L3/L2 cache is stored in a second memory of the second layer-3 switch; and
   the first LAN portion and the second LAN portion are part of the same subnet.

3. The method of claim 1, further comprising:
   subscribing, by the first layer-3 switch, to a multicast group;
   receiving, by the first layer-3 switch, a multicast message that is transmitted to the multicast group by the second layer-3 switch, the multicast message, including a payload of a remote layer-2 broadcast message that is broadcast within the second LAN portion by the second device;
   extracting, by the first layer-3 switch, the payload of the remote layer-2 broadcast message and generating a local layer-2 broadcast message that includes the payload of the remote layer-2 broadcast message; and
   broadcasting, by the first layer-3 switch, the local layer-2 broadcast message in the first LAN portion.

4. The method of claim 1, further comprising:
   receiving a layer-2 broadcast message that is broadcast within the first LAN portion by the first device;
   generating a multicast message that includes a payload of the layer-2 broadcast message; and
   transmitting the multicast message to a multicast group of which the second layer-3 switch is a subscriber.

5. The method of claim 1, wherein the first layer-3 switch includes an extension module, the method further comprising:
   monitoring, by the extension module, the first L3/L2 cache to detect when the first cache entry is deleted from the first L3/L2 cache; and
   transmitting, to the second layer-3 switch, a notification that first device is no longer part of the first LAN portion.

6. The method of claim 1, wherein the first layer-3 switch includes an extension module, the method further comprising:
   monitoring, by the extension module, the first L3/L2 cache to detect when a new entry is added to the first L3/L2 cache, the new entry being associated with a new device that has joined the first LAN portion; and
   transmitting, to the second layer-3 switch, at least a portion of the new entry.

7. The method of claim 1, further comprising generating a routing table entry based on the second cache entry, the routing table entry mapping a layer-3 address of the second device to a layer-3 address of the second layer-3 switch.

8. The method of claim 1, wherein storing at least a portion of the second cache entry into the first L3/L2 cache includes updating the second cache entry by replacing a layer-2 address of the second device with a layer-2 address of the first layer-3 switch and storing the updated entry in the first L3/L2 cache.

9. The method of claim 1, further comprising transmitting at least the portion of the second cache entry to the first device.

10. A system, comprising:
    a memory; and
    a processing circuitry configured to perform the operations of:
    learning a first layer-3/layer-2 (L3/L2) cache, the learning of the first L3/L2 cache including generating a first cache entry that maps a layer-3 address of a first device to a layer-2 address of the first device, the first device being part of a first LAN portion;
    transmitting, over a wireless network, contents of the first L3/L2 cache to a layer-3 switch, the transmitted contents including at least a portion of the first cache entry;
    receiving contents of a second L3/L2 cache that is learned by the layer-3 switch, the received contents including at least a portion of a second cache entry that maps a layer-3 address of a second device to a layer-2 address of the second device, the second device being part of a second LAN portion, the second LAN portion being connected to the first LAN portion via the wireless network; and
    storing at least a portion of the received contents into the first L3/L2 cache.

11. The system of claim 10, wherein:
    the first L3/L2 cache is stored in the memory;
    the second L3/L2 cache is stored in a memory of the layer-3 switch; and
    the first LAN portion and the second LAN portion are part of the same subnet.

12. The system of claim 10, wherein the processing circuitry is further configured to perform the operation of transmitting at least the portion of the second cache entry to the first device.

13. The system of claim 10, wherein the processing circuitry is further configured to perform the operations of:
    subscribing to a multicast group;
    receiving a multicast message that is transmitted to the multicast group by the layer-3 switch, the multicast message, including a payload of a remote layer-2 broadcast message that is broadcast within the second LAN portion by the second device;

extracting the payload of the remote layer-2 broadcast message and generating a local layer-2 broadcast message that includes the payload of the remote layer-2 broadcast message; and broadcasting the local layer-2 broadcast message in the first LAN portion.

14. The system of claim 10, wherein the processing circuitry is further configured to perform the operations of:
receiving a layer-2 broadcast message that is broadcast within the first LAN portion by the first device;
generating a multicast message that includes a payload of the layer-2 broadcast message; and
transmitting the multicast message to a multicast group of which the layer-3 switch is a subscriber.

15. The system of claim 10, wherein the processing circuitry is configured to perform the operations of:
monitoring the first L3/L2 cache to detect when the first cache entry is deleted from the first L3/L2 cache; and
transmitting, to the layer-3 switch, a notification that first device is no longer part of the first LAN portion.

16. The system of claim 10, wherein the processing circuitry is further configured to perform the operations of:
monitoring the first L3/L2 cache to detect when a new entry is added to the first L3/L2 cache, the new entry being associated with a new device that has joined the first LAN portion; and
transmitting, to the layer-3 switch, at least a portion of the new entry.

17. The system of claim 10, wherein the processing circuitry is further configured to perform the operation of generating a routing table entry based on the second cache entry, the routing table entry mapping a layer-3 address of the second device to a layer-3 address of the layer-3 switch.

18. The system of claim 10, wherein storing at least a portion of the second cache entry into the first L3/L2 cache includes updating the second cache entry by replacing a layer-2 address of the second device with a layer-2 address of the system and storing the updated entry in the first L3/L2 cache.

19. A non-transitory computer-readable medium storing one or more processor-executable instructions, which, when executed by at least one processor of a first layer-3 switch, cause the at least one processor to perform the operations of:
learning a first layer-3/layer-2 (L3/L2) cache, the learning of the first L3/L2 cache including generating a first cache entry that maps a layer-3 address of a first device to a layer-2 address of the first device, the first device being part of a first LAN portion;
transmitting, over a wireless network, contents of the first L3/L2 cache to a second layer-3 switch, the transmitted contents including at least a portion of the first cache entry, the second layer-3 switch being part a second LAN portion, the second LAN portion being connected to the first LAN portion via the wireless network;
receiving contents of a second L3/L2 cache that is learned by the second layer-3 switch, the received contents including at least a portion of a second cache entry that maps a layer-3 address of a second device to a layer-2 address of the second device, the second device being part of a second LAN portion; and
storing at least a portion of the received contents into the first L3/L2 cache.

20. The non-transitory computer-readable medium of claim 19, wherein the one or more processor-executable instructions, when executed by the at least one processor, further cause the at least one processor to perform the operations of:
subscribing to a multicast group;
receiving a multicast message that is transmitted to the multicast group by the second layer-3 switch, the multicast message, including a payload of a remote layer-2 broadcast message that is broadcast within the second LAN portion by the second device;
extracting the payload of the remote layer-2 broadcast message and generating a local layer-2 broadcast message that includes the payload of the remote layer-2 broadcast message; and
broadcasting the local layer-2 broadcast message in the first LAN portion.

\* \* \* \* \*